United States Patent [19]

Bergmann

[11] 4,259,985

[45] Apr. 7, 1981

[54] THREE-WAY SOLENOID-OPERATED PINCH VALVE ASSEMBLY

[75] Inventor: Warren C. Bergmann, Clinton, N.J.

[73] Assignee: Brunswick Corporation, Skokie, Ill.

[21] Appl. No.: 970,446

[22] Filed: Dec. 18, 1978

[51] Int. Cl.³ .............................................. F16K 11/00
[52] U.S. Cl. .................... 137/595; 137/870; 251/7
[58] Field of Search .................. 137/595, 870; 251/7

[56] References Cited

U.S. PATENT DOCUMENTS

| | | | |
|---|---|---|---|
| 3,511,469 | 5/1970 | Bell | 251/7 |
| 4,051,867 | 10/1977 | Forberg | 137/595 |
| 4,071,039 | 1/1978 | Goof | 251/7 X |

FOREIGN PATENT DOCUMENTS

| | | | |
|---|---|---|---|
| 78050 | 8/1954 | Denmark | 251/7 |
| 224224 | 11/1968 | U.S.S.R. | 251/7 |

*Primary Examiner*—Gerald A. Michalsky
*Attorney, Agent, or Firm*—John G. Heimovics; William G. Lawler, Jr.

[57] ABSTRACT

A three-way pinch valve assembly is operated with a single solenoid with one pinch valve mounted on each end of the solenoid, one valve will normally be open and the other valve will normally be closed. The plunger of the solenoid is split so that each movable pinch bar of each pinch valve is separately adjustable. A back-up pinch bar for each movable pinch bar is likewise adjustable. A three-way valve is provided by connecting the tubing from the two pinch valves to a T-fitting having a single outlet.

11 Claims, 4 Drawing Figures

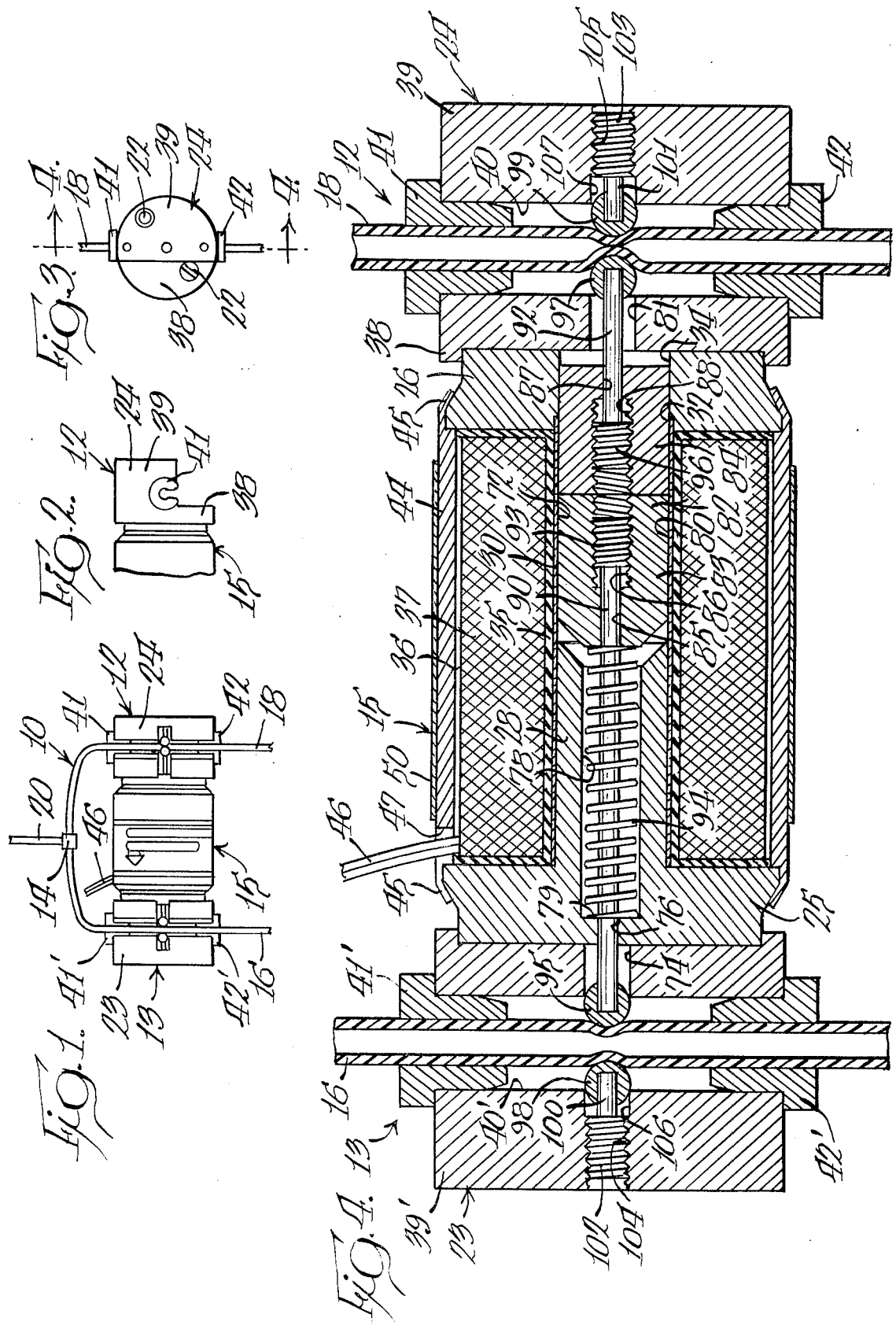

THREE-WAY SOLENOID-OPERATED PINCH VALVE ASSEMBLY

BACKGROUND OF THE INVENTION

1. Field of the Invention

This invention relates to pinch valves and, more particularly, to a three-way solenoid-operated pinch valve assembly.

2. Description of the Prior Art

Heretofore, individual solenoids were used for actuating individual pinch valves. When it was desired to have a three-way pinch valve assembly, two one-way pinch valves were provided with the tubing from each valve connected to a T-fitting. It was necessary to synchronize the operation of the two valves so as to produce an efficient and effective three-way valve. The assembly was expensive, subject to misadjustment and complication.

SUMMARY OF THE INVENTION

A three-way pinch valve assembly has a solenoid which, when actuated, drives a movable pinch bar into contact with one of two resilient tubes. A back-up pinch bar is in alignment with the movable pinch bar and permits the movable pinch bar to contact said one resilient tube to restrict or cutoff flow therethrough. Deactivation of the solenoid permits a biasing means to drive the plunger and an attached pinch bar into contact with an aligned second tube lying between the movable pinch bar and a second back-up pinch bar to restrict or cutoff flow through said second tube. Due to force versus gap characteristics, the useful movement of the solenoid plunger is very limited. To take full advantage of the limited plunger movement, an adjustment is provided for the back-up pinch bars and for the movable pinch bars whereby the first and second tubes may be selectively closed, partially open or completely open depending upon actuation or deactuation of the solenoid. Deactuation of the solenoid will permit the spring to reverse the motion of the plunger so that the first tube is closed or partially open and the second tube is partially or completely open. With the two tubings from the assembly connected with a T-fitting, a three-way valve is provided whereby flow is cut off from one tube and actuated in the other tube simultaneously, with the two tubes connected with the T-fitting to provide continuous flow from the third leg of the T-fitting.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a schematic view of a three-way valve making use of my improved single solenoid-operated pinch valves with the solenoid in a deactivated state;

FIG. 2 is a side view of one end of the pinch valve of FIG. 1;

FIG. 3 is an end view of the valve of the solenoid-operated pinch valve of FIG. 2; and, FIG. 4 is a vertical cross-sectional view taken along the line 4—4 of the improved single solenoid-operated pinch valves of FIG. 3 with the solenoid in a deactivated state.

DESCRIPTION OF THE PREFERRED EMBODIMENT

In a preferred form of the invention, a three-way pinch valve assembly 10 is illustrated and is comprised of fluid flow means including a normally closed pinch valve 12 and a normally open pinch valve 13 mounted on opposite ends of a solenoid 15 with flexible tubing 16 extending through valve 13 and flexible tubing 18 extending through valve 12. Tubings 16 and 18 are connected to a T-fitting 14 which has a third flexible tube 20 connected to the third leg of the T-fitting 14. For the purposes of this description, the tubing 18 through pinch valve 12 is closed and the tubing 16 through pinch valve 13 is open or vice versa, it being understood that by adjustment either one or both valves can be made to be only partially closed, partially open, fully closed or fully open.

The three-way solenoid-actuated pinch valve assembly 10 comprises the solenoid 15 with a pair of body portions 23,24 attached to the opposite ends of said solenoid as by screws or bolts 22. The solenoid 15 includes a pair of spaced apart end caps or plates 25 and 26 with the cap or plate 25 having an integrally formed, transversely projecting hub 28 extending toward the cap or plate 26. A sleeve 30 overlaps the hub 28 and nests in an undercut groove 32 formed in the mouth of an opening 34 in the midportion of the cap or plate 26. A bobbin 35, formed of insulating material, nests between the end caps or plates 25,26 and surrounds the sleeve 30 between said caps or plates. A core or coil 37, is wound on the bobbin 35 and has insulating tape 36 wrapped therearound to insulate the coil 37 from the shell or housing 44. The ends 45 of the shell or housing 44 are crimped over the end caps or plates 25,26 to hold the solenoid together. Appropriate electrical conductors 46 extend through an opening 47 in the shell or housing 44 and are connected to the wiring of the core or coil 37 so as to provide the suitable electrical power when needed. A plate 50 encircles a portion of the shell 44 for receiving identifying information, such as a nameplate or the like.

The body portions 23,24 of the pinch valves 13,12 respectively, are substantially identical in construction, one being a mirror image of the other. Only body portion 24 of valve 12 will be described in detail, it being understood that body portion 23 of valve 13 is the same structure. The body portion 24 has a circular base 38 and an extended portion 39 with an open-sided double-ended passage 40 extending therethrough. Bushings 41 and 42 are assembled on the tubing 18 so that with the tubing 18 in the passage 40, the bushings 41,42 are pressed in each end of the passage 40 in portion 39. The tube 16 is assembled in passage 40' in body portion 23 by means of the bushings 41', 42' being pressed in the ends of said passage. The bushings 41,42, 41',42' may be a solid ring of material or may have a slot cut end-to-end and from the outside to the opening therethrough to facilitate the assembly and disassembly of a piece of tubing.

The passages 40 and 40' in the body portions 24,23 lie transverse to a passage 72 extending through the solenoid 15. Passage 72 is comprised of an opening 74 in the valve body portion 23 in alignment with an opening 76 through the end cap or plate 25. An enlarged opening 78 extends through the remainder of the end cap or plate 25 and through the hub 28 and forms a shoulder 79 in said end cap or plate 25. The passage 72 further includes an opening 80 in the sleeve 30, opening 34 in end cap or plate 26 and opening 81 in the base 38 of pinch valve 12.

A solenoid plunger means 82 is split into two parts 83 and 84 with part 83 having an opening 85 through one end thereof with an aligned enlarged threaded opening 86 through the remainder of said part 83. The other part 84 of the plunger 82 has an opening 87 in the opposite end of the plunger from the opening 85 in the first part 83 and has an aligned enlarged threaded opening 88 through the remainder of said part 84. The threaded openings 86,88 of the parts 83 and 84 are juxtaposed and aligned with respect to each other with the remaining openings 85,87 in the parts 83 and 84 acting as guides for a pair of oppositely extending pins 90 and 92. Pin 90 has a set screw 93 on one end thereof threaded into threaded opening 86 in plunger part 83 with the body of the pin 90 being guided in the opening 85 in the plunger part 83 and opening 76 in the end cap or plate 25 with the outer end thereof extending into the passage 40' in the body portion 23 of valve 13. A shaped pinch bar 95 is secured to the end of the pin 90 where its projects into the passage 40' into contact with flexible tube 16. The second movable pin 92 has a set screw 96 threaded into threaded opening 88 in plunger part 84 with the body of the pin 92 being guided in the opening 87 and extending into the passage 40 in the body portion 24 of valve 12. A shaped pinch bar 97 is fitted on the outer end of pin 92 where it extends into the passage 40 into contact with flexible tube 18.

A pair of back-up pinch bars 98,99 are mounted on pins 100,101 having screw portions 102,103 threaded into threaded portions 104,105 of openings 106,107 in the respective extended portions 39',39 of valve body portions 24,23. The back-up pinch bars 98,99 project into passages 40',40 in alignment with the pinch bars 95 and 97 on the opposite sides of the tubing 16,18 and in contact with said tubing. A compression spring 94 is seated in the opening 78 in the hub 28, surrounds the pin 90, and bears against shoulder 79 in end cap or plate 25 and against the part 83 of the plunger 82 to urge the plunger 82 and the two movable pinch bars 95,97 to the right as viewed in FIG. 4, to close tubing 18 by pinching the tubing between movable pinch bar 97 and back-up pinch bar 99. At the same time, movable pin 90 has its pinch bar 95 and back-up pinch bar 98 spaced apart enough to permit flow in tubing 16. As illustrated, the movable pinch bar 97 and the back-up pinch bar 99 engage with the tube 18 to the extent that the walls of the tube 18 are brought in contact with each other to cut off flow through the tube 18. The tube 16 has the pinch bar 95 and back-up pinch bar 98 just engaging the outer surfaces of the tube 16 so that the tube 16 is only slightly constricted in the lumen of the tube where it passes the pinch bars so that fluid may flow in tube 16.

The tubing 16,18 from pinch valves 13 and 12, respectively, are connected to the T-fitting 14 which has the tubing 20 connected to a third leg of the T-fitting 14 and to a work area. The direction of fluid flow may be reversed with the tubing 20 connected to a fluid source and the tubing 16,18 connected to work areas, without departing from the invention.

In setting up the three-way pinch valve apparatus, the body portion 24 is removed from the solenoid 15 by removing the screws 22, the plunger part 84, with the pinch bar 97 attached thereto, is slid out of the opening 34 in end cap or plate 26 and out of the opening 80 in the sleeve 30. A screwdriver or other tool is inserted in the threaded opening 86 in the plunger part 83 to engage with the set screw 93 on the pin 90 of the movable pinch bar 95 and, upon turning the set screw 93, will advance or retract the pinch bar 95 so as to adjust the amount of compression being applied to the flexible tube 16. The set screw 96 on the other movable pinch bar 97 is likewise adjusted by turning the set screw 96 relative to the plunger part 84 so that the pinch bar 97 is properly located with respect to the tubing 18. The part 84 of the plunger 82 is then reinserted in the solenoid 15 and the body portion 24 is reattached to the solenoid. The screws 102,103 on the adjustment members or back-up pinch bars 98,99 are then turned in the threaded portions 104,105 of the openings 106,107 to adjust the pinch bars 98,99, respectively, in proper position with respect to the tubes 16 and 18 and with respect to the movable pinch bars 95,97.

With the assembly connected in a three-way system, such as illustrated in FIG. 1, the tubes 16 and 18 communicate with the passageway in the T-fitting 14 which in turn communicates with the tube 20 for movement of fluids onward into the system. Upon actuation of the solenoid 15, the plunger 82 will be driven to the left as viewed in FIG. 4 to compress the spring 94 and to move the movable pinch bar 95 to the left to pinch the tubing 16 and to cut off flow through the tubing 16. At the same time, the plunger 82 moves the pinch bar 97 from pinched engagement with the tubing 18 whereby fluid is permitted to flow through the tubing 18. Upon releasing the current to the solenoid 15, the spring 94 bearing on the shoulder 79 in the opening 78 in the hub 28 will drive the plunger 82 to the right which will once again move the pinch bar 97 against tube 18 to close off the passage through the tube 18 and open the passage in the tube 16.

With the device herein disclosed, a single solenoid is effective to operate two pinch valves simultaneously. In this way, it is not necessary to provide synchronizing mechanisms which necessitated careful adjustment to be certain that the cutoff and start up of flow through the respective tubes was simultaneous. With the present device, this is no problem in that the action is simultaneous and, in effect, some flow is passing through one or the other tubing at all times. It should be recognized that the movable pinch bars 95,97 and the back-up pinch bars 98,99 may be adjusted so that both tubings 16,18 could have continuous flow, but at varying rates depending upon the settings of the pinch bars 95,97, 98,99 relative to the tubing 16,18. In this way, the T-fitting 14 becomes a mixing valve which can have the ratios of the contents of tubing 16 and 18 varied depending on the settings of the pinch bars 95,97, 98,99 and depending upon actuation or non-actuation of the solenoid.

I claim:

1. A solenoid-operated pinch valve assembly having a solenoid and a pair of body portions carried by each end of the solenoid, a passage in each body portion intersecting a passage extending through said solenoid, a plunger nested in said passage in said solenoid and having biasing means for urging said plunger toward one of said passages in one of said body portions, a movable pinch bar affixed to one end of said plunger and extending into one of said passages in said body portions, a second movable pinch bar affixed to the other end of said plunger and extending into the other of said passages, a separate flexible tubing extending through each passage of said body portions with a portion of each tubing being in alignment with one of said movable pinch bars, a back-up pinch bar carried by each body portion in alignment with said portion of said flexible tubing and in alignment with one of said movable pinch bars, means on said plunger for adjusting the position of said movable pinch bars relative to said flexible tubing and means for adjusting said back-up pinch bars relative to said flexible tubing whereby said biasing means urges one of said movable pinch bars into position to restrict the flow in one of said tubings while the other pinch bar is in position to permit flow in the other of said tubings and means for energizing said solenoid for compressing said biasing means and moving said movable pinch bars for restricting flow in said other of said tubings while permitting flow in the said one of said tubings.

2. A solenoid-operated pinch valve as claimed in claim 1 wherein said movable pinch bars are individually adjusted relative to said tubing.

3. A solenoid-operated pinch valve as claimed in claims 1 or 2 wherein said fixed pinch bars are individually adjusted relative to said tubing to accommodate for different diameter tubing and to accommodate for different degrees of restriction of flow through said tubing.

4. A solenoid-operated pinch valve as claimed in claim 1 wherein said plunger is split into two parts, one end of one said movable pinch bars is threaded into one of said plunger parts and is adjustable relative to said plunger part, and one end of the other movable pinch bar is threaded into the other of said plunger parts and is adjustable relative to said other plunger part.

5. A solenoid-operated pinch valve as claimed in claim 1 wherein said back-up pinch bars are threaded into openings in said body portions so that turning one of said pinch bars relative to said body portion will advance or retract said back-up pinch bar relative to said tubing in said body portion.

6. A solenoid-operated pinch valve as claimed in claim 1 wherein said solenoid has said body portions attached to the ends of said solenoid, said solenoid having said passage in said solenoid extending along the longitudinal axis of said solenoid, a shoulder in said passage in said solenoid near one end of said solenoid against which one end of said biasing means rests, said plunger being slidably mounted in said passage in the solenoid and being biased by said biasing means, each of said body portions having one of said passages therethrough and means for positioning said flexible tubing in said passages in said body portions in alignment with said movable and back-up pinch bars.

7. A solenoid-operated valve assembly comprising:
(a) a solenoid defining a central, open-ended passageway therethrough;
(b) plunger means nested within said passageway for movement in a first axial direction upon energization of said solenoid;
(c) biasing means for moving said plunger means in a second axial direction opposite said first direction upon deenergization of said solenoid;
(d) first and second fluid flow means disposed adjacent respective opposite ends of said solenoid in alignment with the open ends of said passageway;
(e) first fluid control means affixed on a first end of said plunger means for restricting the flow of fluid through said first fluid flow means upon movement of said plunger means in said first axial direction;
(f) second fluid control means affixed on a second end of said plunger means for restricting the flow of fluid in said second fluid flow means upon movement of said plunger means in said second axial direction; and,
(g) adjustment means for permitting the flow of fluid through each respective fluid flow means upon the restriction of the flow of fluid through the oppositely disposed fluid flow means.

8. A solenoid-operated valve assembly as claimed in claim 7, wherein each said fluid flow means includes a flexible member for directing the flow of fluid therethrough, and wherein each said fluid control means includes valve means for selectively compressing the flexible member of the adjacent fluid flow means to restrict the flow of fluid therethrough.

9. A solenoid-operated valve assembly as claimed in claim 8, wherein each said flexible member comprises a flexible tube transversely aligned adjacent an open end of said passageway, and wherein each said valve means comprises a pinch bar member adapted for selectively pinching said tube of the adjacent fluid flow means to restrict the flow of fluid therethrough when said plunger means is moved axially toward said adjacent fluid flow means.

10. A solenoid-operated valve assembly as claimed in claim 7, wherein said adjustment means includes means for adjusting the position of said first and second fluid control means on said plunger means relative to said first and second fluid flow means, respectively.

11. A solenoid-operated valve assembly as claimed in claim 10, wherein said adjustment means further includes an adjustment member carried by each said fluid flow means for cooperating with the respectively adjacent fluid control means to permit and regulate the flow of fluid through its respective fluid flow means when the flow of fluid through the oppositely disposed fluid flow means is estricted.

* * * * *